United States Patent
Park et al.

(10) Patent No.: US 7,813,578 B2
(45) Date of Patent: Oct. 12, 2010

(54) METHOD AND APPARATUS FOR UNOBTRUSIVELY CORRECTING PROJECTED IMAGE

(75) Inventors: Tae-suh Park, Yongin-si (KR); Sei-bum Ban, Seoul (KR); Moon-sik Jeong, Seongnam-si (KR); Yong-beom Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 970 days.

(21) Appl. No.: 11/639,252

(22) Filed: Dec. 15, 2006

(65) Prior Publication Data
US 2007/0230815 A1 Oct. 4, 2007

(30) Foreign Application Priority Data
Apr. 4, 2006 (KR) .................. 10-2006-0030648

(51) Int. Cl.
G06K 9/40 (2006.01)
H04N 5/64 (2006.01)
G03B 21/14 (2006.01)

(52) U.S. Cl. .................. 382/254; 348/744; 353/69

(58) Field of Classification Search ............ 382/162, 382/254, 312, 321, 274, 275, 305; 348/744–747; 353/69–70; 359/202.1
See application file for complete search history.

(56) References Cited

U.S. PATENT DOCUMENTS 4,472,037 A 9/1984 Lipton
5,091,773 A * 2/1992 Fouche et al. ............ 348/806
5,231,481 A * 7/1993 Eouzan et al. ............ 348/658
5,369,450 A * 11/1994 Haseltine et al. .......... 348/745
5,475,447 A * 12/1995 Funado .................... 348/745
5,793,340 A * 8/1998 Morita et al. ................ 345/7
6,999,133 B2 * 2/2006 Krogstad et al. .......... 348/746
7,003,172 B2 * 2/2006 Takeuchi et al. ........... 382/254
7,130,095 B1 * 10/2006 Wood .................... 359/201.1
7,204,596 B2 * 4/2007 Tamura .................... 353/70
7,457,458 B1 * 11/2008 Daniel et al. ............. 382/159
2003/0214510 A1 11/2003 Tajima

FOREIGN PATENT DOCUMENTS

| JP | 07-131742 A | 5/1995 |
| JP | 2003-087689 A | 3/2003 |
| JP | 2005-148131 A | 6/2005 |
| JP | 2005-148298 A | 6/2005 |
| JP | 2005-151418 A | 6/2005 |
| WO | WO 2005/015490 A2 | 2/2005 |

OTHER PUBLICATIONS

Oliver Bimber, et al., "Embedded Entertainment With Smart Projectors", Jan. 2005, pp. 48-55, 2005 IEEE.

* cited by examiner

Primary Examiner—Kanji Patel
(74) Attorney, Agent, or Firm—Sughrue Mion, PLLC

(57) ABSTRACT

A method and apparatus are provided for unobtrusively estimating the characteristics of a projection surface, in order to correct the distortion of images resulting from the characteristics of the projection surface in the case of a projector. The method includes projecting at least one reference pixel and at least one counterbalance pixel corresponding to the reference pixel onto consecutive image frames, and correcting an image frame to be projected using correction information determined based on photographic information of the reference pixel.

20 Claims, 8 Drawing Sheets

PROJECTED IMAGE FRAMES

PROJECTED IMAGE FRAMES

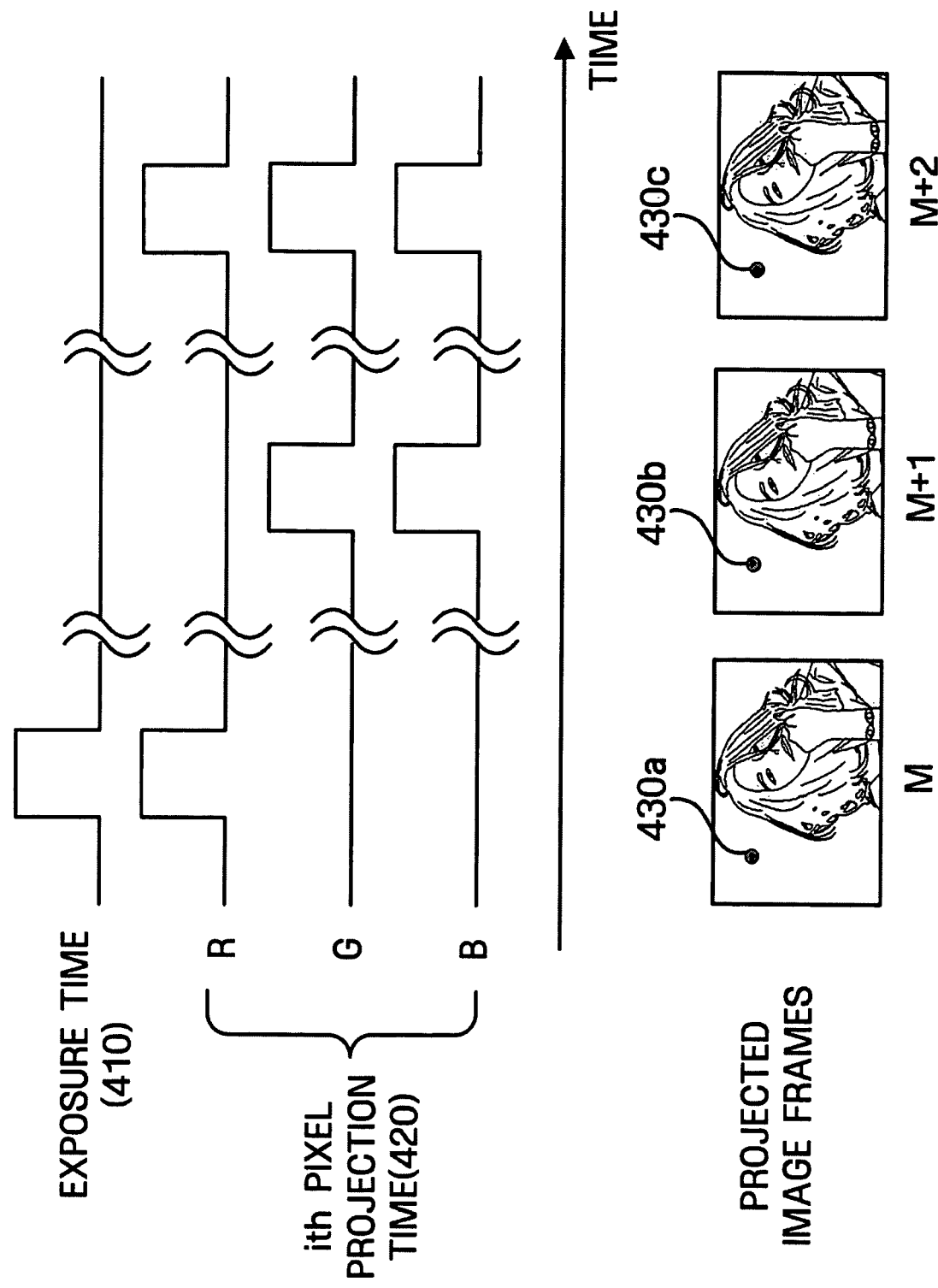

FIG. 7
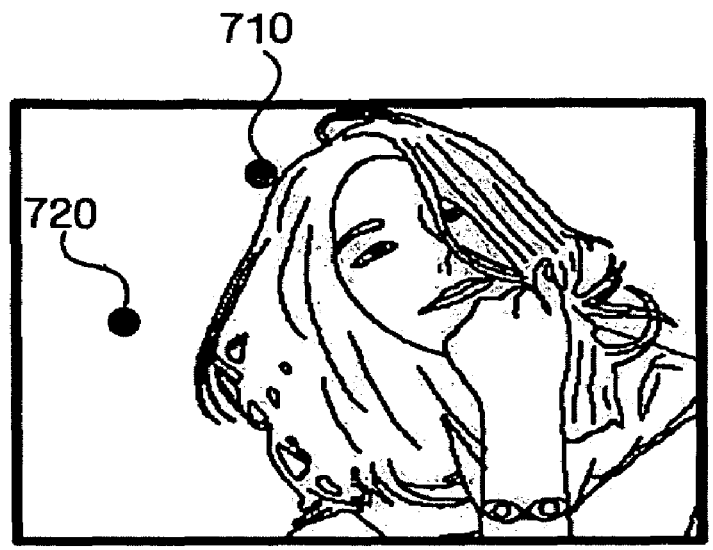
(A) PROJECTED IMAGE FRAME
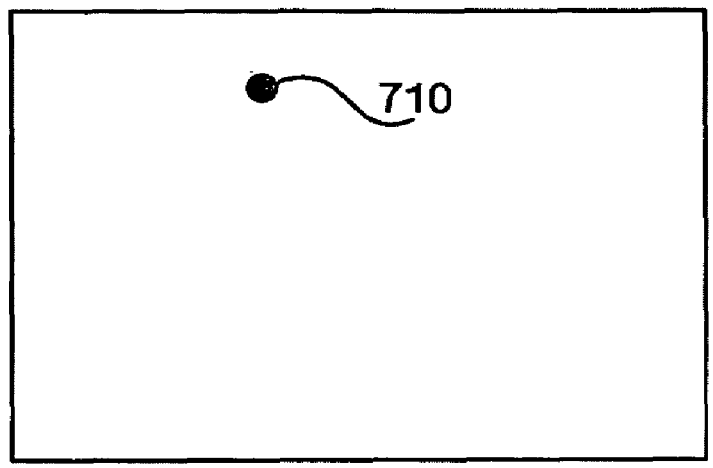
(B) IMAGED FRAME 1
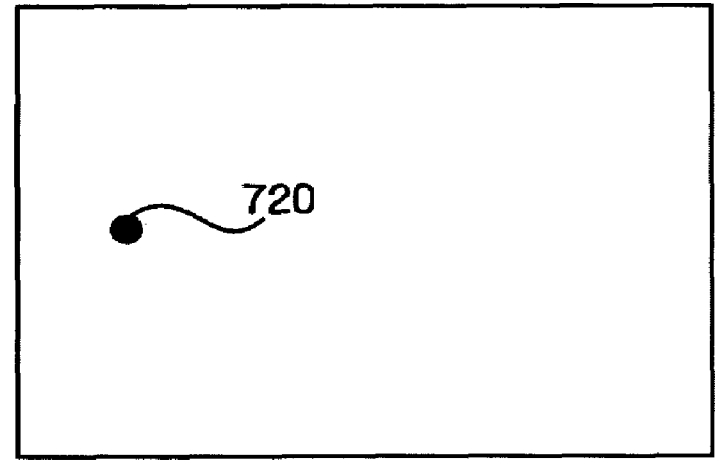
(C) IMAGED FRAME 2

METHOD AND APPARATUS FOR UNOBTRUSIVELY CORRECTING PROJECTED IMAGE

CROSS-REFERENCE TO RELATED APPLICATION

This application claims priority from Korean Patent Application No. 10-2006-0030648 filed on Apr. 4, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to image correction, and more particularly, to correcting projected images so that, when images are projected onto a plane from a projector, image distortion is avoided.

2. Description of the Related Art

As is generally known in the art, a display system using a projector displays image frames by projecting them onto a planar screen. When the screen has a hue, however, the color of image frames projected onto the screen is distorted. In addition, when the screen is not completely planar, projected image frames are distorted geometrically due to the uneven screen.

In order to correct the distortion of projected image frames, chromatic and geometric characteristics of the screen must be modeled. Hereinafter, this process will be referred to as "screen estimation." A related art method for modeling the characteristics of the screen includes the steps of projecting a simple test pattern onto the screen before image frames are projected, photographing the projected pattern with a camera, and comparing the projected pattern with the photographed one. The result of comparison is used to obtain a function regarding the characteristics of the screen. By applying the inverse function of the obtained function to-be-projected image frames the user can watch image frames without distortion resulting from the characteristics of the screen. Pertinent correction technologies are disclosed in the paper "Embedded Entertainment with Smart Projectors" by Bimber, O., Emmerling, A., and Klemmer, T. (IEEE Computer, January 2005, pp. 56-63), as well as in patent publication WO 2005/015490 A2 and U.S. patent application Publication No. 2003-0214510.

Recently, there has been an increasing demand for technology that can correct the distortion of image frames resulting from the characteristics of the screen so that image frames can be projected not only onto projector screens, but also onto other types of projection surfaces (e.g., walls, curtains).

However, related art methods for correcting the distortion of image frames have a problem in that, before correction is performed, a number of simple text patterns must be projected onto the screen and photographed for the purpose of screen estimation. This renders the correction process complicated. In addition, projection of image frames of desired content must be suspended until the correction process is over. Particularly, users will be displeased if the characteristics of the screen vary during the viewing of content, due to movement of the screen or projector, or an illumination change, and the screen must be re-estimated frequently.

Therefore, a technology for estimating a screen while image frames are being projected and without being noticed by the user is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for correcting the distortion of image frames resulting from the characteristics of a projection surface by estimating the screen without a user noticing the process.

In accordance with an aspect of the present invention, there is provided a method of correcting an image based on a projector in a raster scan mode, the method including projecting at least one reference pixel and at least one counterbalance pixel onto consecutive image frames, the counterbalance pixel corresponding to the reference pixel, and correcting a to-be-projected image frame by using correction information based on photographic information of the reference pixel.

In accordance with another aspect of the present invention, there is provided an apparatus for correcting an image based on a projector in a raster scan mode, the apparatus including a projection unit projecting at least one reference pixel and at least one counterbalance pixel onto consecutive image frames, the counterbalance pixel corresponding to the reference pixel, and an image processing unit correcting a to-be-projected image frame by using correction information based on photographic information of the reference pixel.

BRIEF DESCRIPTION OF THE DRAWINGS

The above and other aspects of the present invention will be apparent from the following detailed description of exemplary embodiments taken in conjunction with the accompanying drawings, in which:

FIG. 4 shows the synchronization between a photography unit 150 and a projection unit 140 according to an exemplary embodiment of the present invention;

FIG. 7 shows image frames, which have a photographed reference pixel, according to an exemplary embodiment of the present invention.

DETAILED DESCRIPTION OF THE EXEMPLARY EMBODIMENTS

Figure 1:
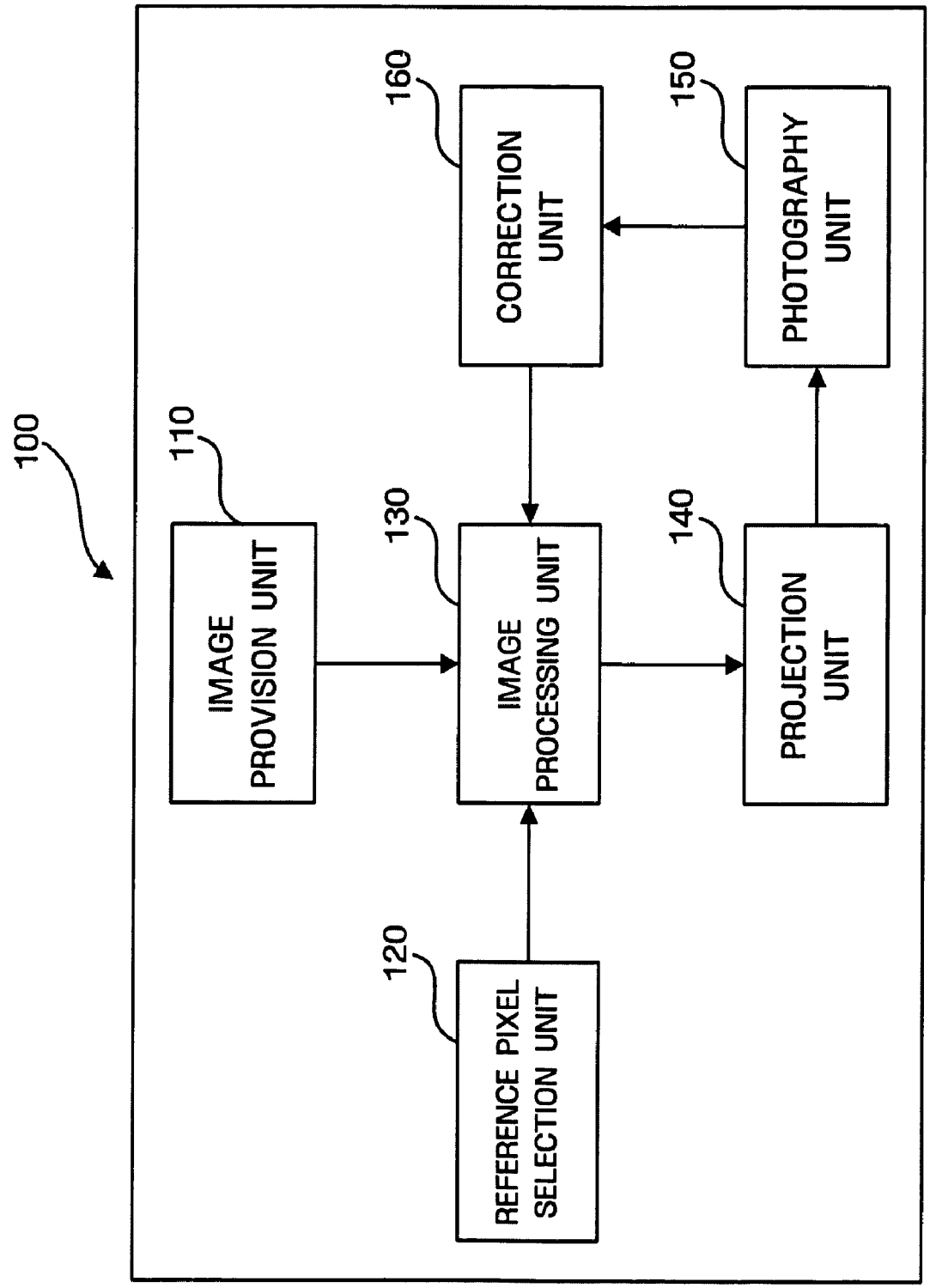
FIG. 1 is a block diagram showing an image-correction apparatus according to an exemplary embodiment of the present invention.

Hereinafter, exemplary embodiments of the present invention will be described with reference to the accompanying drawings. The matters defined in the description such as a detailed construction and elements are nothing but the ones provided to assist in a comprehensive understanding of the invention. Thus, it is apparent that the present invention can be carried out without those defined matter. In the following description of the exemplary embodiments, the same drawing reference numerals are used for the same elements even in different drawings. Also, a detailed description of known functions and configurations incorporated herein will be omitted when it may make the subject matter of the present invention rather unclear.

FIG. 1 is a block diagram showing an image-correction apparatus according to an exemplary embodiment of the present invention. As shown, an image-correction apparatus 100 includes an image provision unit 110, a reference pixel selection unit 120, an image processing unit 130, a projection unit 140, a photography unit 150, and a correction unit 160. A projector-scanner system may be used to implement the image-correction apparatus 100.

The image provision unit 110 provides image frames to be projected. As used herein, the image frames to be projected include not only moving pictures, but also still images. In the case of moving pictures, the image provision unit 110 provides a plurality of image frames, which are consecutive in terms of time. In the case of still images, the image provision unit 110 repeatedly provides the same image frame.

The reference pixel selection unit 120 selects at least one reference pixel from a plurality of pixels, which constitute an image frame, and provides the image processing unit 130 with corresponding information. The reference pixel is used to correct the distortion of projected image frames, which may result from geometric or chromatic characteristics of a projection surface onto which image frames are to be projected.

The reference pixel selection unit 120 is synchronized with the image provision unit 110 so that, when the image provision unit 110 provides image frames, the reference pixel selection unit 120 can provide information regarding reference pixels. Preferably, but not necessarily, reference pixels between image frames are positioned in such a manner that they are not adjacent to each other. Considering that human eyes are sensitive horizontal movement, reference pixels between image frames may preferably have different transverse pixel lines and, if possible, different longitudinal pixel lines. It may be preferable that, when a plurality of reference pixels are selected for each image frame, reference pixels within the same image frame are not adjacent to one another.

Figure 2:
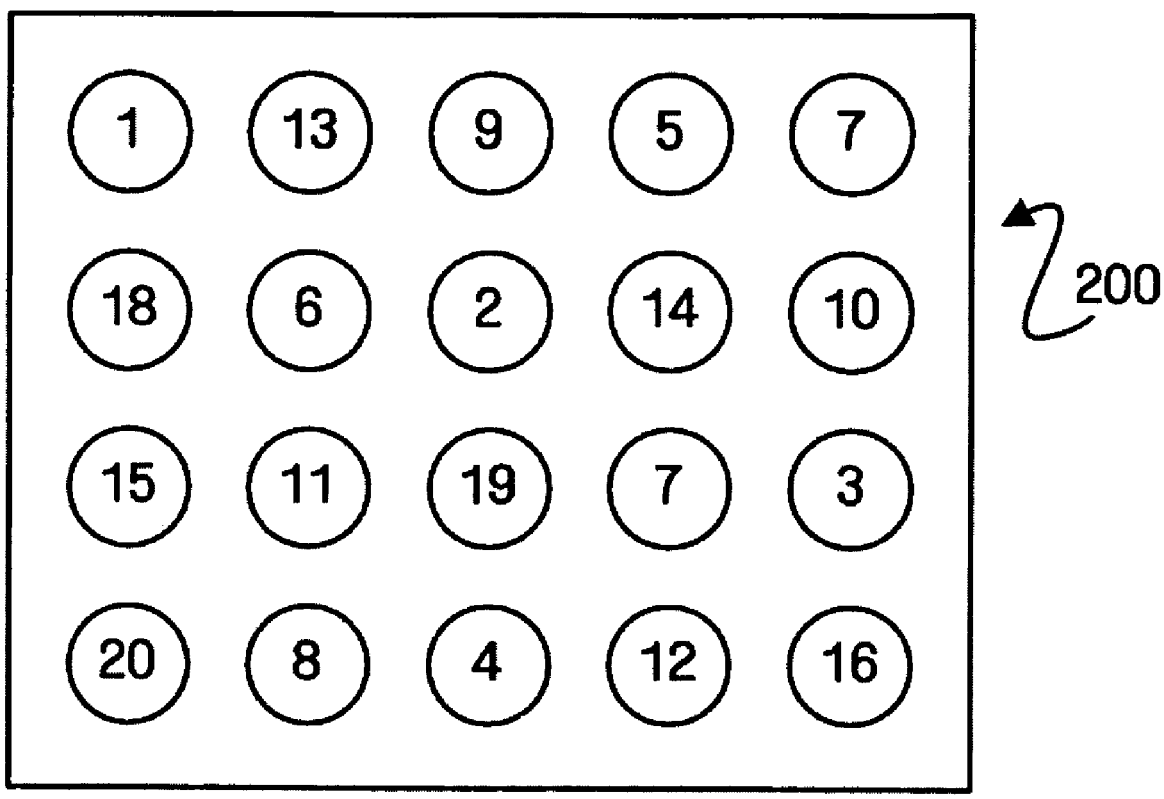
FIG. 2 shows the order of selecting reference pixels according to an exemplary embodiment of the present invention.

FIG. 2 shows the order of selecting reference pixels according to an exemplary embodiment of the present invention. For clarity of description, it is assumed that a small image frame 200 having a resolution of 4×5 is used in the exemplary embodiment shown in FIG. 2, and the image frame 200 has a total of 20 pixels. In FIG. 2, each circle constituting the image frame 200 refers to a pixel, and the number inside the circle refers to the order of selection as a reference pixel.

As shown in FIG. 2, reference pixels having consecutive selection numbers are not adjacent to each other. For example, a reference pixel labeled 2 is not adjacent to that labeled 1. In addition, they are on different pixel lines. This selection order minimizes the possibility that the user might notice the projected reference pixels.

The image processing unit 130 replaces color, which is assigned to a reference pixel (selected by the reference pixel selection unit 120) of an image frame provided by the image provision unit 110, with a predetermined reference color (e.g. red, green, blue), which is used for color correction of the image frame.

When the image processing unit 130 has assigned a reference color to a reference pixel of an image frame, it assigns a complementary color of the reference color to a pixel (hereinafter, referred to as a counterbalance pixel) of the next image frame in the same position as the reference pixel of the preceding image frame. For example, when red color has been assigned as a reference color to a reference pixel of an image frame, the image processing unit 130 assigns cyan color, which is complementary to red, to a counterbalance pixel of the next image frame. Although the reference and counterbalance pixels are projected by the projection unit 140 at an interval, they appear as two colors which are in contrast to each other and which alternate with each other in the same position on the projection surface due to contrast effect, which is one of the major characteristics of human color perception. As a result, the user can hardly notice the reference and counterbalance pixels.

The image processing unit 130 reflects correction information based on the geometric and chromatic characteristics of the projection surface, which have been modeled by the correction unit 160, in image frames.

The projection unit 140 projects image frames, which have been processed by the image processing unit 130, onto a projection surface, which may be a screen, a curtain, or a wall, but its type is not limited to that in the present invention. Particularly, the projection surface is not necessarily flat (i.e. may have some protrusions). In addition, the projection surface may have various colors.

As mentioned above, even when a reference color and a complementary color are projected onto a reference pixel and a counterbalance pixel of consecutive image frames by the projection unit 140, respectively (the pixels are in the same position), the user can notice neither the reference color nor the complementary color due to characteristics of human color perception. Preferably, the projection unit 130 projects image frames in a raster scan mode. Examples of image frames projected by the projection unit 130 are given in FIGS. 3A and 3B.

Figure 3A:
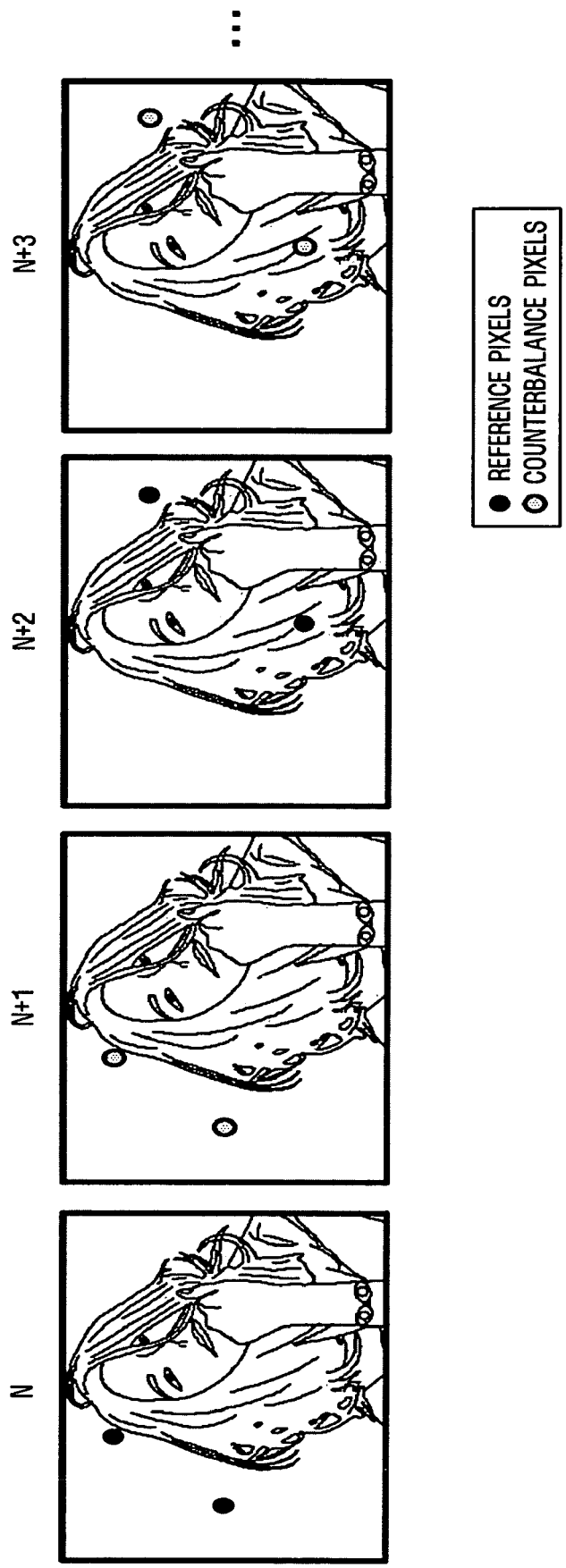
FIG. 3A shows image frames, which have reference and counterbalance pixels reflected therein, according to an exemplary embodiment of the present invention.

FIG. 3A shows image frames, which have reference and counterbalance pixels reflected therein, according to an exemplary embodiment of the present invention. It is clear from FIG. 3A that odd-numbered image frames N, N+2 have two reference pixels and that even-numbered image frames N+1, N+3 have counterbalance pixels in the same position as the reference pixels of the odd-numbered image frames N, N+2. In order to project image frames as shown in FIG. 3A, the reference pixel selection unit 120 may provide information every time an odd-numbered image frame is provided regarding reference pixels of the corresponding image frame. Alternatively, the reference pixel selection unit 120 may entirely provide the order of selecting reference pixels so that every time the image provision unit 110 provides an odd-numbered image frame, the image processing unit 130 assigns a reference color to reference pixels in that order.

Figure 3B:
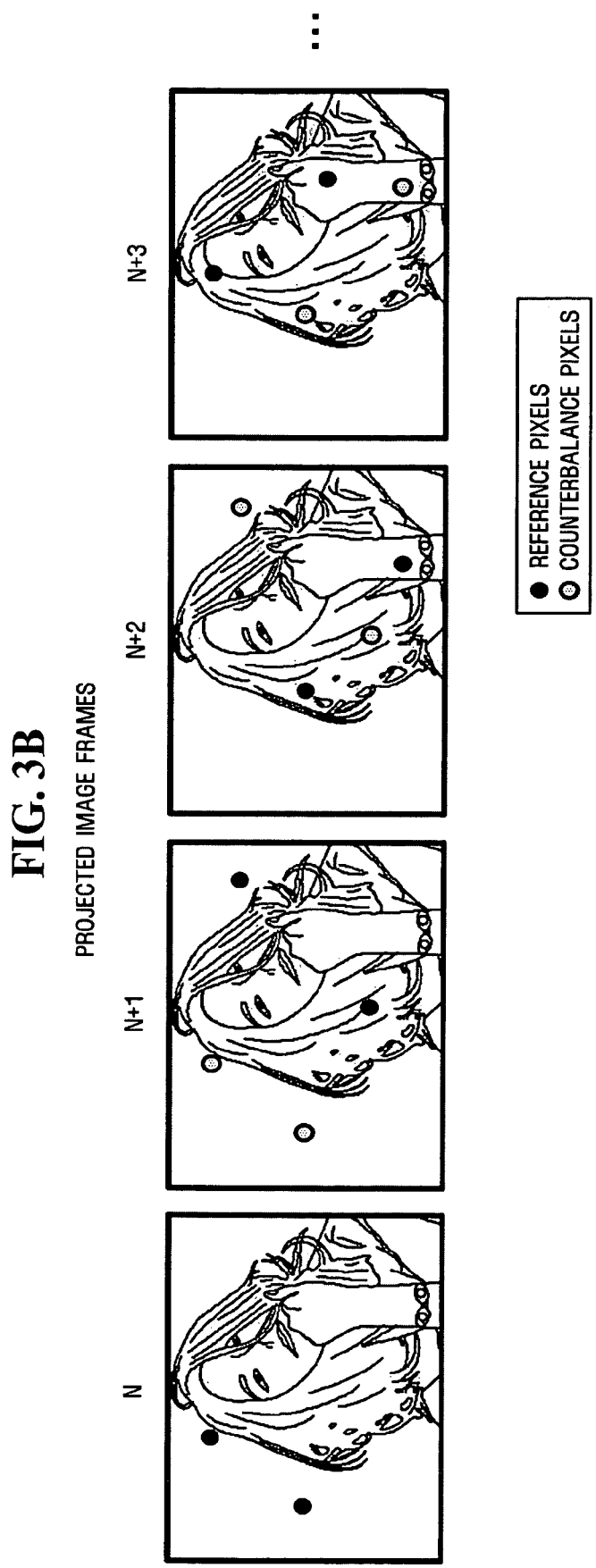
FIG. 3B shows image frames, which have reference and counterbalance pixels reflected therein, according to another exemplary embodiment of the present invention.

FIG. 3B shows image frames having reference and counterbalance pixels reflected therein, according to another exemplary embodiment of the present invention. It is clear from FIG. 3B that the first image frame N, into which reference pixels are initially inserted for a correction process, has two reference pixels inserted therein, while following image frames have two reference pixels and two counterbalance pixels, which correspond to the two reference pixels of the first image frame. The exemplary embodiment shown in FIG. 3B is advantageous in that a subsequent correction process can be performed faster than in the case of the exemplary embodiment show in FIG. 3A. However, it is to be noted that, in the case of the exemplary embodiment shown in FIG. 3B, each image frame has irrelevant pixels (preference pixels and counterbalance pixels) twice as many as those of the exemplary embodiment shown in FIG. 3A. This means that the reference and counter balance pixels are more likely to be noticed by the user.

Although each image frame has two reference pixels in the exemplary embodiments shown in FIGS. 3A and 3B, the number of reference pixels is not limited to that in the present invention, and each image frame may have one or more reference pixels. However, if there are too many reference pixels in each image frame, they are more likely to be noticed by the user. Therefore, the number of reference pixels for each image frame must be properly determined in consideration of the resolution and projection rate of image frames, as well as the computation capacity of the image-correction apparatus 100. In summary, the exemplary embodiment shown in FIG. 3A, wherein reference pixels and counterbalance pixels are alternately inserted into consecutive image frames, and the exemplary embodiment shown in FIG. 3B, wherein each image frame has its own reference pixels and counter balance pixels which correspond to reference pixels of the preceding image frame, may be selectively applied in accordance with requirements imposed on the image-correction apparatus 100.

Referring to FIG. 1 again, the photography unit 150 is adapted to photograph reference pixels projected onto the projection surface. To this end, the photography unit 150 may include an imaging device, such as a charge-coupled device (CCD), a complementary metal oxide semiconductor (CMOS), or a single-carrier modulation photo detector (SMPD).

The photography unit 150 is synchronized with the projection unit 140 so that, when the projection unit 140 projects reference pixels, the photography unit 150 can photograph the reference pixels. As mentioned above, the projection unit 140 projects image frames in a raster scan mode. Since the photography unit 150 is free from persistence of vision and contrast effect, which are peculiar to human eyes, it can photograph, one by one, pixels projected by the projection unit 140 by synchronizing itself with camera exposure time. This means that the photography unit 150 can selectively take pictures of reference pixels by performing photography at the moment reference pixels of an image frame are projected. Considering that the counterbalance pixels are used to reduce the possibility that the user will notice the reference pixels, the photography unit 150 does not necessarily photograph counterbalance pixels projected onto the projection surface.

FIG. 4 shows the timing relationship between exposure time 410 of the photography unit 150 and projection time 420, at which an $i^{th}$ pixel of an image frame is projected by the projection unit 140. When the projection unit 140 projects a reference color R onto an $i^{th}$ pixel 430a, which is the reference pixel of an $M^{th}$ image frame, the exposure time 410 of the photography unit 150 is synchronized with the projection time of the reference pixel, which is then photographed.

An $i^{th}$ pixel 430b of an $(M+1)^{th}$ image frame acts as a counterbalance pixel of the reference pixel 430a inserted into the $M^{th}$ image frame. The projection unit 140 projects a complementary color of the reference color onto the $i^{th}$ pixel 430b of the $(M+1)^{th}$ image frame. Since the $i^{th}$ pixel 430b is not a reference pixel, the photography unit 150 does not photograph it.

The projection unit 140 projects a color, which has been assigned in the original image frame, onto an $i^{th}$ pixel 430c of an $(M+2)^{th}$ image frame. Since the $i^{th}$ pixel 430c is not a reference pixel, the photography unit 150 does not photograph it.

Referring to FIG. 1 again, the correction unit 160 models the characteristics of the projection surface by using an image frame photographed by the photography unit 150 (hereinafter, referred to as an image frame). Particularly, the geometric and chromatic characteristics of the projection surface can be calculated by the correction unit 160.

The geometric characteristics of the projection surface can be calculated by comparing the position of reference pixels existing on an image frame with that of reference pixels existing on the original image frame. For example, the correction unit 160 may detect the coordinate of reference pixels from at least one image frame and compare the coordinate with that of reference pixels of the original image frame for geometric correction. More particularly, the correction unit 160 compares the relative distance and direction between coordinates of reference pixels detected from an image frame with those of reference pixels of the original image frame so that the geometry of the projection surface can be estimated. Technologies for modeling the geometric characteristics of a projection surface from corresponding coordinates are widely known in the art, and detailed description thereof will be omitted hereon. However, the type of method for modeling the geometric characteristics of the projection surface is not limited in any manner in the present invention.

The correction unit 160 compares the color of reference pixels detected from an image frame with a reference color and calculates the chromatic characteristics of the projection surface. Assuming that a reference color is R having a chromaticity level of 100 and that the color of a reference pixel detected from an image frame is measured to be R having a chromaticity level of 120, the correction unit 160 may instruct the image processing unit 130 to reduce the chromaticity level of R by 20 with regard to a pixel of every image frame inputted from the image provision unit 110, the pixel being in the same position as the reference pixel of the image frame.

It can be easily understood by those skilled in the art that image frames projected by the projection unit 140 may be distorted due to characteristics of the projection unit 140. In addition, when the photography unit 150 photographs an image frame projected onto the projection surface, the resulting image frame may be distorted due to characteristics of the photography unit 150. Therefore, characteristics of the projection unit 140 and the photography unit 150, which may distort image frames, are preferably reflected during color correction.

Technologies for modeling the chromatic characteristics of a projection surface by comparing a reference color with a photographed color are widely known in the art, and detailed description thereof will be omitted herein. However, the type of method for modeling the chromatic characteristics of the projection surface is not limited in any manner in the present invention.

As such, the correction unit 160 corrects the geometry and color in a pixel unit and guarantees precise correction.

Although the image correction unit 100 includes both a projection unit 140 and a photography unit 150 in the present exemplary embodiment, the present invention not limited to this construction. For example, the image correction unit 100 may include a projector interface unit (not shown), which acts as a connector to a projector (not shown) for projecting image frames instead of the projection unit 140. Furthermore, the image correction unit 100 may include a camera interface unit (not shown), which acts as a connector to a camera (not shown) for photographing projected image frames instead of the photography unit 150.

The term "unit", which is used herein to refer to each component of the image-correction apparatus 100, may be implemented as a type of "module". The module includes, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

The operation of the image-correction apparatus 100 will now be described.

Figure 5:
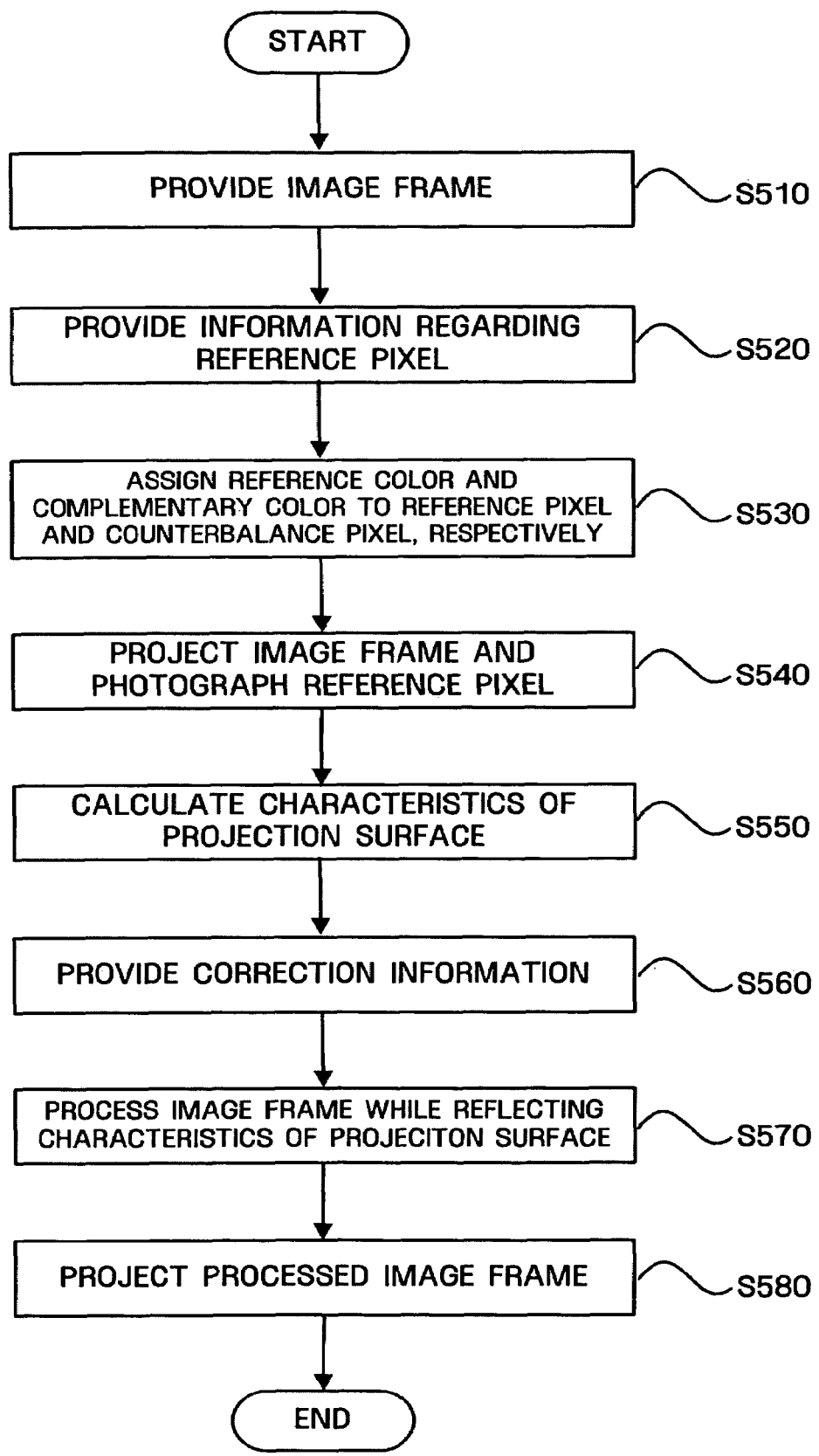
FIG. 5 is a flowchart showing an image correction method according to an exemplary embodiment of the present invention.

FIG. 5 is a flowchart showing an image correction method according to an exemplary embodiment of the present invention.

The image provision unit 110 provides a series of image frames to be projected (S510). The reference pixel selection unit 120 provides information regarding reference pixels when the image provision unit 110 provides image frames (S520). The reference pixel selection unit 120 may position the reference pixels in real-time and provide corresponding information. Alternatively, the reference pixel selection unit 120 may provide a reference pixel selection order which has been stored in advance.

The image processing unit 130 assigns a reference color to a reference pixel (selected by the reference pixel selection unit 120) of an image frame provided by the image provision unit 110, instead of the color of the original image frame. In addition, the image processing unit 130 assigns a complementary color of the reference color to a counterbalance pixel, which corresponds to the reference pixel (S530).

As a result, image frames, which have reference and counterbalance pixels inserted therein, are created. The reference and counterbalance pixels may be alternately inserted into consecutive image frames as in the case of FIG. 3A. Alternatively, each image frame may have both a reference pixel and a counterbalance pixel, which corresponds to a reference pixel of the preceding image frame, as in the case of FIG. 3B.

The projection unit 140 successively projects image frames, which have been processed by the image processing unit 130, onto the projection surface. The photography unit 150 photographs reference pixels from the projected image frames (S540).

For better understanding of the present invention, operation S540 will be described in more detail with reference to FIG. 6.

When the image processing unit 130 provides an image frame having a reference pixel inserted therein (S610), the projection unit 140 projects some pixels inside the image frame in a projection order (S620). As mentioned above, the projection unit 140 projects image frames in a raster scan mode. This means that the projection unit 140 projects image frames from the image processing unit 130 in a pixel unit.

The photography unit 150 determines whether a projected pixel is a reference pixel (S630). If so, the photography unit 150 proceeds to a photography process (S640). The photography unit 150 provides the correction unit 160 with an image frame, the reference pixel of which has been photographed (S650). If it is determined in operation S630 that the projected pixel is not a reference pixel, the photography unit 150 does not proceed to the photography process. The photography unit 150 is synchronized with the projection unit 140 and is informed of the time when the projection unit 140 projects a reference pixel.

The projection unit 140 determines whether a projected pixel is the last pixel in the projection sequence of the image frame (S660). When there is a remaining pixel, the projection unit 140 projects the next pixel in the projection sequence of the image frame (S620). Then, operations S630 to S650 are repeated.

If it is determined in operation S660 that every pixel constituting an image frame has been projected, the projection unit 140 is provided with the next image frame from the image processing unit 130 (S670). Operations S620 to S660 are repeated for the newly provided image frame.

Figure 6:
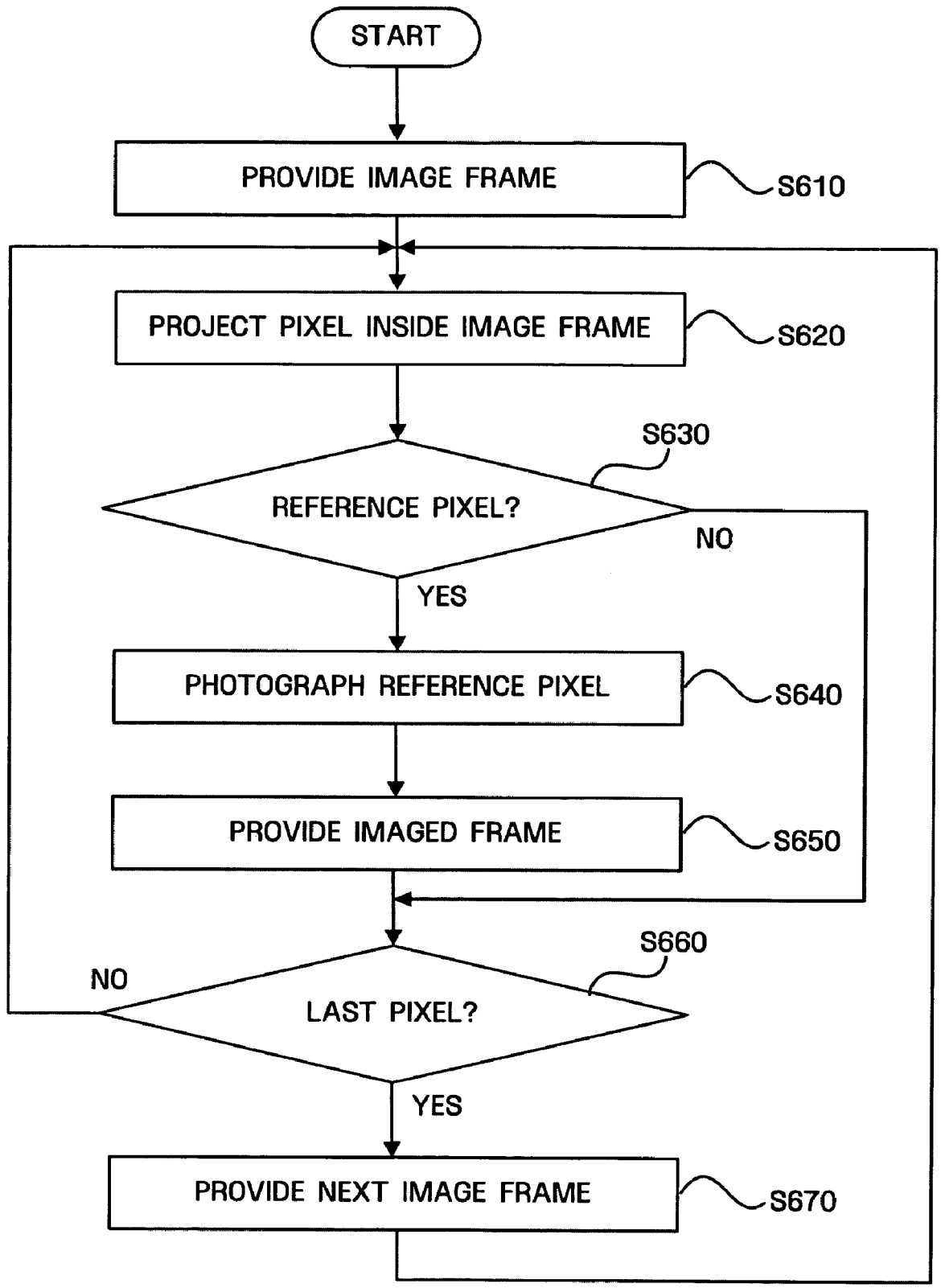
FIG. 6 is a flowchart showing a process for photographing a reference pixel according to an exemplary embodiment of the present invention.

When image frames are projected through the operations of FIG. 6, they include reference and counterbalance pixels. However, the color of a reference pixel of an image frame is complementary to that of a counterbalance pixel of the next image frame, which is in the same position as the reference pixel of the preceding image frame. As a result, both colors counterbalance each other, due to human color perception characteristics, and are not noticed by the user.

As mentioned above, the photography unit 150 and the projection unit 140 are synchronized with each other, and the projection unit 140 uses a raster scan mode. As a result, the photography unit 150 can photograph each reference pixel projected by the projection unit 140 and provide an image frame having a reference pixel. Assuming that an image frame, which has two reference pixels 710 and 720 inserted therein, is projected as shown in (A) of FIG. 7, the photography unit 150 takes pictures two times and obtains two images frames, which have the reference pixels 710 and 720, respectively, as shown in (B) and (C) of FIG. 7.

The above-mentioned operations of FIG. 6 are preferably repeated until all pixels, which may exist on an image frame, undergo a reference pixel selection process. For example, when the projection unit 140 projects image frames having a resolution as shown in FIG. 2, $1^{st}$ to $20^{th}$ pixels in the selection sequence are successively inserted into and projected onto consecutive frames as reference pixels. Then, the photography unit 150 repeatedly photographs the reference pixels until it obtains all image frames for them. However, this is only an example and does not limit the present invention in any manner.

Referring to FIG. 5 again, the correction unit 160 detects reference pixels from image frames provided by the photography unit 150 and improves the characteristics of the projection surface based on information regarding the detected reference pixels (S550). More particularly, the correction unit 160 calculates the geometric and chromatic characteristics of spots of the projection surface, which correspond to the reference pixels, by using the coordinate and color of the reference pixels of the image frames.

Based on the characteristics of the projection surface obtained in the above process, the correction unit 160 provides the image processing unit 130 with information necessary for geometric and chromatic correction of image frames (S560). Then, the image processing unit 130 processes the image frames while reflecting the geometric and chromatic characteristics of the projection surface (S570). Particularly, the image processing unit 130 can apply the inverse function of a modeling function regarding the characteristics of the projection surface, which can be obtained in operation S550, to image frames to be newly projected.

Then, the projection unit 140 can project image frames, which have been corrected by the image processing unit 130 so as to reflect the characteristics of the projection surface S580.

Although it has been assumed that the correction unit 160 calculates both geometric and chromatic characteristics of the projection surface, the correction unit 160 may calculate only one of them, if necessary.

Preferably, but not necessarily, the above-mentioned correction process is finished after all pixels, which may exist on an image frame, undergo a reference pixel selection process. For example, when the image-correction apparatus 100 projects image frames having a resolution as shown in FIG. 2, the $1^{st}$ to $20^{th}$ pixels in the selection sequence are successively inserted into and projected onto consecutive frames. The correction process is not finished until all image frames for them are obtained.

However, the present invention is not limited to the above processes. For example, the image-correction apparatus 100 may regard some of pixels existing on an image frame as reference pixels and calculate the characteristics of spots of a projection surface, which correspond to the reference pixels. The characteristics of spots of the projection surface, which correspond to remaining pixels (i.e., pixels not regarded as reference pixels), are interpolated from those of the spots corresponding to the reference pixels, so that characteristics of the entire projection surface can be calculated.

For the sake of more precise color correction, the degree of distortion regarding each channel of reference colors R, G, B may be preferably calculated for the same pixel. In this case, a pixel having a specific coordinate on an image frame may be selected as a reference pixel three times for reference colors R, G, B. However, this requires a long correction time. Therefore, only one of R, G, B (e.g., R, which is easily noticeable) may be used as a reference color.

As mentioned above, the method and the apparatus for unobtrusively correcting projected images according to the exemplary embodiments of the present invention are advantageous in that, since the projection surface can be estimated without users being aware of the process, any change of the projection surface can be dealt with continuously without interrupting the projection of content. In addition, use of a raster scan mode makes it possible to perform more precise geometric estimation than in the case of a related art machine vision mode, even with a low-performance calculator.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of correcting an image based on a projector in a raster scan mode, the method comprising:
projecting at least one reference pixel and at least one counterbalance pixel corresponding to the reference pixel onto consecutive image frames; and
correcting an image frame to be projected using correction information determined based on photographic information of the reference pixel
wherein the at least one reference pixel and the at least one counterbalance pixel are projected at an interval.

2. The method of claim 1, further comprising selecting the reference pixel.

3. The method of claim 1, wherein, if a plurality of reference pixels have been inserted into one image frame, locations of the reference pixels are not adjacent to one another.

4. The method of claim 1, wherein, if a sequence of selected reference pixels are inserted into different image frames, locations of consecutive reference pixels are not adjacent to each other.

5. The method of claim 1, wherein a reference color is assigned to the reference pixel, a complementary color of the reference color is assigned to the counterbalance pixel, and the counterbalance pixel has a coordinate which is identical to a coordinate of the reference pixel.

6. The method of claim 1, further comprising photographing the reference pixel, the reference pixel being projected onto a projection screen.

7. The method of claim 1, wherein, correcting of the image frame to be projected comprises subjecting the image frame to be projected to at least one of geometric correction and chromatic correction.

8. The method of claim 1, wherein the photographic information comprises at least one of a coordinate and a color of the reference pixel, and the coordinate and the color are detected from an image frame regarding the reference pixel.

9. The method of claim 1, further comprising calculating characteristics of a projection surface based on the photographic information of the reference pixel, the characteristics of the projection surface being used to provide the correction information.

10. The method of claim 9, wherein the characteristics of the projection surface comprise at least one of geometric characteristics and chromatic characteristics.

11. An apparatus for correcting an image based on a projector in a raster scan mode, the apparatus comprising:
a projection unit which projects at least one reference pixel and at least one counterbalance pixel onto consecutive image frames, the counterbalance pixel corresponding to the reference pixel; and
an image processing unit correcting an image frame to be projected using correction information determined based on photographic information of the reference pixel,
wherein the at least one reference pixel and the at least one counterbalance pixel are projected at an interval.

12. The apparatus of claim 11, further comprising a reference pixel selection unit which selects the reference pixel.

13. The apparatus claim 11, wherein, if a plurality of reference pixels have been inserted into one image frame, locations of the reference pixels are not adjacent to one another.

14. The apparatus of claim 11, wherein, if a sequence of selected reference pixels are inserted into different image frames, locations of consecutive refererice pixels are not adjacent to each other.

15. The apparatus of claim 11, wherein a reference color is assigned to the reference pixel, a complementary color of the reference color is assigned to the counterbalance pixel, and the counterbalance pixel has a coordinate which is identical to a coordinate of the reference pixel.

16. The apparatus of claim 11, further comprising a photography unit which photographs the reference pixel, the reference pixel being projected onto a projection screen.

17. The apparatus of claim 11, wherein the image processing unit subjects the image frame to be projected to at least one of geometric correction and chromatic correction.

18. The apparatus of claim 11, wherein the photographic information comprises at least one of a coordinate and a color of the reference pixel, and the coordinate and the color is detected from an image frame regarding the reference pixel.

19. The apparatus of claim 11, further comprising a correction unit which calculates characteristics of a projection surface based on the photographic information of the reference pixel, the characteristics of the projection surface being used to provide the correction information.

20. The apparatus of claim 19, wherein the characteristics of the projection surface comprise at least one of geometric characteristics and chromatic characteristics.

* * * * *